(12) United States Patent
Wang

(10) Patent No.: US 11,926,359 B1
(45) Date of Patent: Mar. 12, 2024

(54) HANDCART

(71) Applicant: Dongguan Tianyu Luggage Accessories Co., Ltd., Guangdong (CN)

(72) Inventor: Weiqiang Wang, Guangdong (CN)

(73) Assignee: Dongguan Tianyu Luggage Accessories Co., Ltd., Guangdong (CN)

( * ) Notice: Subject to any disclaimer, the term of this patent is extended or adjusted under 35 U.S.C. 154(b) by 0 days.

(21) Appl. No.: 18/370,509

(22) Filed: Sep. 20, 2023

(51) Int. Cl.
*B62B 3/02* (2006.01)

(52) U.S. Cl.
CPC .......... *B62B 3/025* (2013.01); *B62B 2205/30* (2013.01)

(58) Field of Classification Search
CPC .......... B62B 3/025; B62B 3/16; B62B 3/165; B62B 5/064; B62B 5/065; B62B 5/067; B62B 5/0083; B62B 5/0093; B65D 21/0223; B65D 21/0028
See application file for complete search history.

(56) References Cited

U.S. PATENT DOCUMENTS

| | | | | |
|---|---|---|---|---|
| 5,249,823 A * | 10/1993 | McCoy | | B62B 3/02 280/87.01 |
| 6,431,580 B1 * | 8/2002 | Kady | | B62B 1/125 280/655 |
| 6,536,796 B1 * | 3/2003 | Solomon | | B62B 3/02 280/655 |
| 6,783,147 B1 * | 8/2004 | Green, Sr. | | B62B 1/20 D34/12 |
| 6,877,764 B2 * | 4/2005 | Sagol | | B62B 5/06 280/655 |
| 7,066,477 B2 * | 6/2006 | Dubois | | B62B 3/16 280/166 |
| 7,134,673 B2 * | 11/2006 | Ferraro | | A47B 87/0253 280/33.993 |
| 7,954,830 B2 * | 6/2011 | Begin | | B62B 3/04 280/47.35 |
| 9,327,873 B2 * | 5/2016 | Frankenberg | | B65D 19/42 |
| 9,694,838 B2 * | 7/2017 | Gullino | | B62D 1/14 |
| RE47,022 E * | 9/2018 | Sosnovsky | | B65D 45/22 |
| 10,065,666 B2 * | 9/2018 | Nussbaum | | B62B 3/1476 |
| 10,392,043 B2 * | 8/2019 | Guerdrum | | B62B 5/067 |
| 10,668,938 B1 * | 6/2020 | Song | | B62B 1/12 |
| 11,008,030 B2 * | 5/2021 | Cohen | | B62B 5/0083 |
| 11,173,939 B2 * | 11/2021 | Hassell | | B65D 21/0212 |

(Continued)

FOREIGN PATENT DOCUMENTS

CN 217510051 U 9/2022

*Primary Examiner* — Katy M Ebner
(74) *Attorney, Agent, or Firm* — Cooper Legal Group, LLC

(57) ABSTRACT

A handcart, belonging to the technical field of handcart technology, includes a handcart body, a pull rod and a folding box; the pull rod is provided with a mounting component, the mounting component is rotatably connected to the handcart body; a bottom of the folding box is provided with an insertion component, a top of the folding box is configured with a first groove configured to be inserted in by the insertion component, the handcart body is configured with a second groove configured to be inserted in by the insertion component; the handcart body is rotatably connected to a first snap component, and the folding box is configured with a first snapping groove configured to be snap-fitted with the first snap component

7 Claims, 8 Drawing Sheets

(56) References Cited

U.S. PATENT DOCUMENTS

| | | | | |
|---|---|---|---|---|
| 11,492,029 | B2* | 11/2022 | Ryan | B62B 5/0485 |
| 11,590,995 | B2* | 2/2023 | Gardner | B62B 3/1428 |
| 2011/0220531 | A1* | 9/2011 | Meether | B62B 3/02 |
| | | | | 206/508 |
| 2015/0076143 | A1* | 3/2015 | Ryan | B65D 1/46 |
| | | | | 493/162 |
| 2019/0352050 | A1* | 11/2019 | Ismert | B65D 11/1826 |
| 2020/0172137 | A1* | 6/2020 | Ryan | B65D 11/1833 |
| 2020/0269894 | A1* | 8/2020 | Cohen | B62B 3/04 |
| 2020/0353962 | A1* | 11/2020 | Kravchenko | B62B 1/14 |
| 2023/0034505 | A1* | 2/2023 | Ryan | B65D 1/46 |

* cited by examiner

A

B

HANDCART

TECHNICAL FIELD

The present application relates to a technical field of a handcart technology, and, in particular, relates to a handcart.

BACKGROUND ART

A handcart is a logistics device with a box, wheels and a pull rod. The handcart may transport an associated object to a designated location in the way that the pull rod is drawn in combination with the rolling of the wheels, which is labor-saving and convenient.

When the handcart must be stored or a plurality of handcarts must be delivered to anywhere else, more room is required for placement, which leads to an inconvenient use, since the handcarts are unstably placed due to the structure thereof, which tend to topple over particularly when being stacked, thereby being damaged. Therefore, the above problem urgently needs to be solved.

SUMMARY

In order to improve the structure and the convenience of a handcart. A handcart is disclosed.

The handcart disclosed includes a handcart body, a pull rod and a folding box; the pull rod is provided with a mounting component, the mounting component is rotatably connected to the handcart body; a bottom of the folding box is provided with an insertion component, a top of the folding box is configured with a first groove configured to be inserted in by the insertion component, the handcart body is configured with a second groove configured to be inserted in by the insertion component; the handcart body is rotatably connected to a first snap component, and the folding box is configured with a first snapping groove configured to be snap-fitted with the first snap component.

By adopting the above solution, the handcart body can be drawn via the pull rod to move the handcart, thereby driving the folding box mounted on the handcart body to move, wherein the folding box is configured to load goods. When the folding box is mounted at the handcart body, the folding box is inserted into the second groove with the insertion component, thereby realizing the installing and positioning of the folding box relative to the handcart body, and then the first snap component is rotated to be snap-fitted with the first snapping groove, thereby realizing a stable installation of the folding box on the handcart body. In addition, the folding box can be detached from the handcart body, the detached folding box can be placed and stored in position after being folded, and the pull rod can be folded and stored in position by rotating in the direction to the handcart body after being retracted, thereby saving space for placing the handcart, and is convenient to use.

Optionally, the folding box includes a base, a top plate, two first box plates and two second box plates, the insertion component is provided at the base, the first groove is defined at the top plate, and the first snapping groove is defined in one of the second box plates;

the two first box plates and the two second box plates are arranged around a periphery of the base, a bottom of each of the two first box plates is rotatably connected to the base, and a bottom of each of the two second box plates is rotatably connected to the base;

one of the two second box plates is in snap connection with the two first box plates, respectively, and the other of the two second box plates is in snap connection with the two first box plates, respectively; and the top plate is covered on the two first box plates and the two second box plates, and the top plate is in snap connection with the two second box plates.

By adopting the above solution, when the folding box is folded, the top plate is detached from the first box plates and the second box plates, then the second box plates and the first box plates are unsnapped, the two first box plates are folded to be laid on the base, and then the two second box plates are folded to be laid on the first box plates, so as to realize a folding operation. When the folding box must be loaded with goods, the first box plates and the second box plates are rotated in turn, and then are arranged around the base and snap-fitted with each other to form a space for loading goods.

Optionally, two ends of each of the two first box plates each are provided with a snap-fit element, and two ends of each of the two second box plates each are configured with a snap-fit hole configured to be in snap-fit engagement with the snap-fit element.

By adopting the above solution, the snap-fit element and the snap-fit hole are beneficial for the snap-fit engagement of the first box plate with the second box plate.

Optionally, each of the two first box plates is further provided with a locking assembly, the locking assembly comprises a first locking bar, a second locking bar and a knob, each of the two first box plates is configured with an accommodation groove for accommodating the knob, the first locking bar and the second locking bar are both inserted into a respective one of the two first box plates, a first end of the first locking bar protrudes from a first groove wall of the accommodation groove, a second end of the first locking bar protrudes from a first end of the respective one of the two first box plates, a first end of the second locking bar protrudes from a second groove wall of the accommodation groove, and a second end of the second locking bar protrudes from a second end of the respective one of the two first box plates;

the knob is provided with a rotating shaft, the accommodation groove is configured with a hole configured to be rotationally connected with the rotating shaft, the knob is further provided with a first sliding component and a second sliding component, the first end of the first locking bar is configured with a first opening for sliding of the first sliding component, the first end of the second locking bar is configured with a second opening for sliding of the second sliding component; and the two second box plates each are configured with a locking slot configured to be inserted in by the first locking bar or the second locking bar.

By adopting the above solution, the knob is rotated for rotating the first sliding component and the second sliding component, then, the rotation of the first sliding component is converted into the protruding of the first locking bar via the first opening, so that the other end of the first locking bar protrudes from the first box plate and is inserted into the corresponding locking slot; while the rotation of the second sliding component is converted into the protruding of the second locking bar via the second opening, so that the other end of the second locking bar protrudes from the first box plate and is inserted into the corresponding locking slot, which improves the connection stability of the first box plate and the second box plate.

Optionally, the handcart body includes a frame body, wheel seats and universal wheels, the mounting component is rotatably connected to the frame body, the wheel seats are mounted at the frame body, the universal wheels are mounted at the wheel seats, the second groove is defined at a top of each of the wheel seats, and the first snap component is provided at the handcart body.

By adopting the above solution, the wheel seat can be screwed to the universal wheel conveniently. The universal wheel is beneficial for mating with the pull rod to realize a multi-directional movement.

Optionally, each of the two second box plates are rotatably connected to a second snap component, and two ends of the top plate each are configured with a second snapping groove configured to be in snap connection with the second snap component.

By adopting the above solution, the second snap component is in snap connection with the second snapping groove, which can ensure a stable connection of the top plate and the second box plate.

Optionally, the second snap component is configured with a relief slot.

By adopting the above solution, the relief slot is beneficial for providing space for hand to apply force.

Optionally, each of the two second box plates is configured with a handheld slot.

By adopting the above solution, the handheld slot is beneficial for applying force on the box or the whole handcart, conveniently.

In summary, at least one of the following beneficial technical effects is realized:

1. In the present application, the handcart body can be drawn via the pull rod to move the handcart, thereby driving the folding box mounted on the handcart body to move, wherein the folding box is configured to load goods. When the folding box is mounted at the handcart body, the folding box is inserted into the second groove with the insertion component, thereby realizing the installing and positioning of the folding box relative to the handcart body, and then the first snap component is rotated to be snap-fitted with the first snapping groove, thereby realizing a stable installation of the folding box on the handcart body. In addition, the folding box can be detached from the handcart body, the detached folding box can be placed and stored in position after being folded, and the pull rod can be folded and stored in position by rotating in the direction to the handcart body after being retracted, thereby saving space for placing the handcart, and is convenient to use.

DETAILED DESCRIPTION

The present application is further described in detail below in combination with FIGS. 1-8.

Figure 1:
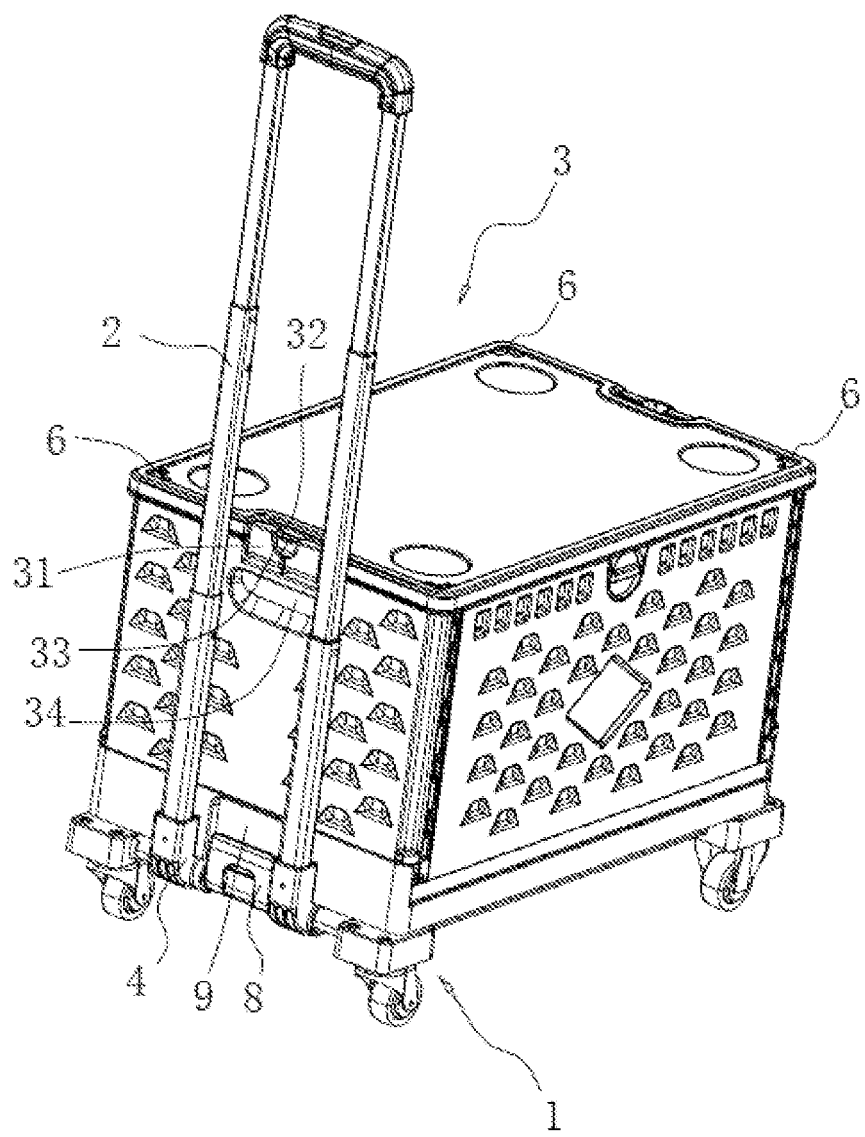
FIG. 1 is a schematic view of a handcart according to an embodiment of the present application.
Figure 8:
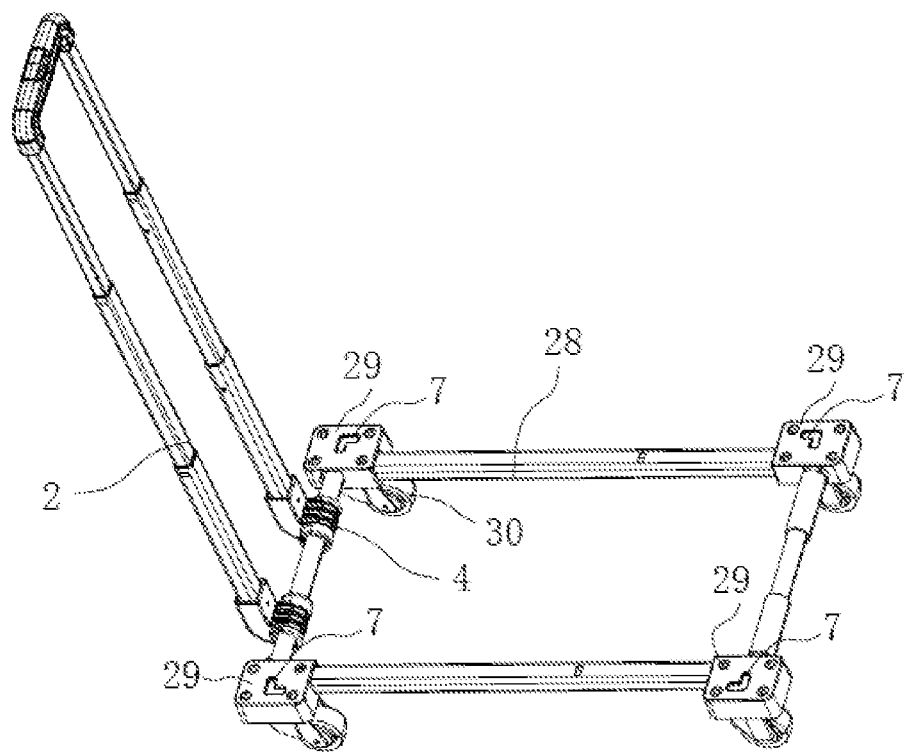
FIG. 8 is a schematic view of a handcart body of a handcart according to an embodiment of the present application.

Referring to FIG. 1 and FIG. 8, a handcart includes a handcart body 1, a pull rod 2 and a folding box 3. The pull rod 2 is provided with a mounting component 4, the mounting component 4 is rotatably connected to the handcart body 1. A bottom of the folding box 3 is provided with an insertion component 5, a top of the folding box 3 is configured with a first groove 6 configured to be inserted in by the insertion component 5, and the handcart body 1 is configured with a second groove 7 configured to be inserted in by the insertion component 5. The handcart body 1 is rotatably connected to a first snap component 8, and the folding box 3 is configured with a first snapping groove 9 configured to be snap-fitted with the first snap component 8.

The existing handcart is improved by the present application, by which a folding box 3 is configured to load goods. When the handcart needs to be pulled to load and transport goods, the folding box 3 is mounted on and positioned relative to the handcart body 1 by way that the insertion component 5 is inserted into the second groove 7, and then a firm installation of the folding box 3 on the handcart body 1 is realized by rotating the first snap component 8 to snap into the first snapping groove 9.

When the handcart needs to be placed, the first snap component 8 is rotated to be detached from the first snapping groove 9, and then the insertion component 5 is detached from the second groove 7, so that the folding box 3 is detached from the handcart body 1. The folding box 3 may be placed and stored after being folded, in which the pull rod 2 can be folded and stored by rotating in the direction to the handcart body 1 after being retracted, so as to save a space for placing the handcart and improve the use convenience of the handcart.

Specifically, when a plurality of the folding boxes 3 with goods need to be stacked, the folding boxes 3 can be stacked on top of each other after they are detached from the handcart body, wherein the insertion component 5 of first folding boxes 3 can be inserted into the first groove 6 of the second folding box 3 below, so as to realize the stacking positioning and improve the storage stability, which is conducive to prevent the handcart body 1 from obstructing a stacked placement of the folding boxes 3, and to avoid tipping of the boxes to damage. Further, the handcart body 1 can be folded and stored by rotating the pull rod 2 in the direction to the corresponding handcart body 1, so as to save the space for placing and improve the convenience of the handcart.

Specifically, the quantity of the insertion components 5 is at least 2, the quantity of the first grooves 6 is at least 2, and the quantity of the second grooves 7 is at least 2.

In the case of two, two insertion components 5 are respectively diagonally positioned at the bottom of the folding box 3, two first grooves 6 are diagonally positioned at the top of the folding box 3, and two second grooves 7 are respectively diagonally positioned at the handcart body 1.

In the case of three, three insertion components 5 are respectively provided in three corners at the bottom of the folding box 3, three first grooves 6 are respectively defined in three corners at the top of the folding box 3, and three second grooves 7 are respectively defined in three corners of the handcart body 1.

In the case of four, four insertion components 5 are respectively provided in four corners at the bottom of the folding box 3, four first grooves 6 are respectively defined in four corners at the top of the folding box 3, and four second grooves 7 are respectively defined in four corners of the handcart body 1. Such an arrangement is conducive to an accurate positioning of the installation.

Specifically, the cross section of the insertion component 5 is L-shaped, the cross section of the first groove 6 is L-shaped, and the cross section of the second groove 7 is L-shaped, such that the contact area of the insertion component 5 and the first groove 6 is increased, so as to increase friction. In some embodiments, the cross section of the insertion component 5, the first groove 6 and the second groove 7 can all be shaped as cross, X, triangle, polygon or star. Specifically, the pull rod 2 is a telescopable pull rod 2.

Figure 2:
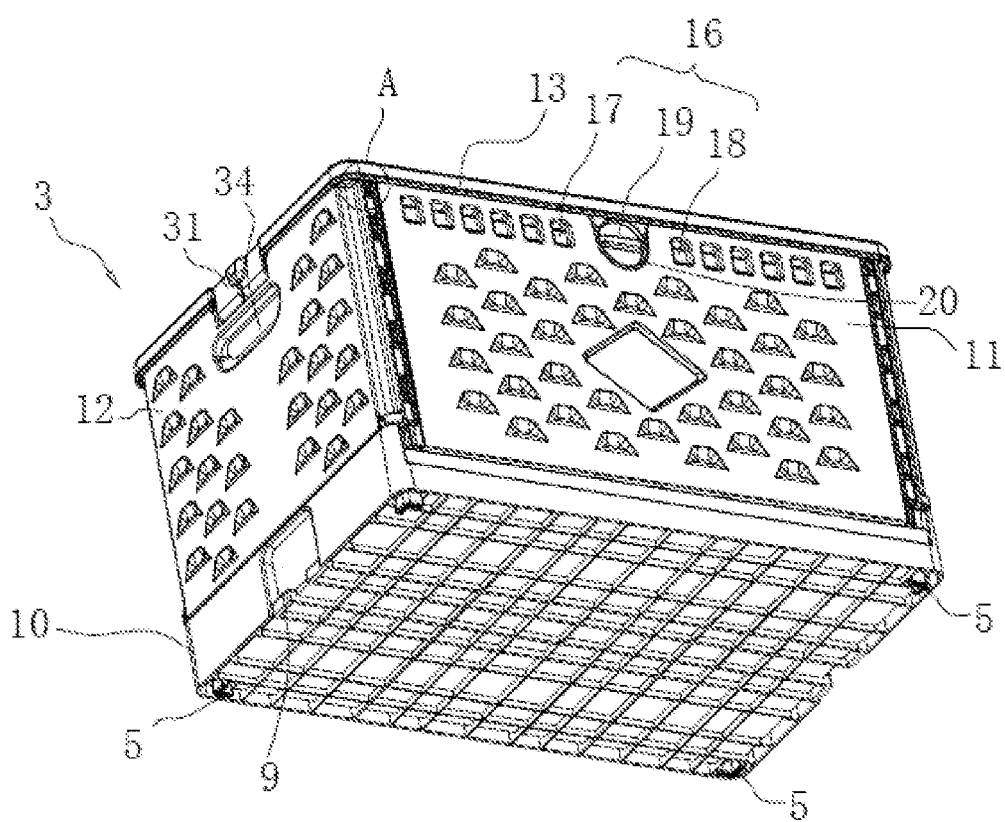
FIG. 2 is a schematic view of a box of a handcart according to an embodiment of the present application.

Referring to the embodiment shown in FIGS. 1 and 2, the folding box 3 includes a base 10, a top plate 13, two first box plates 11 and two second box plates 12, wherein the insertion component 5 is provided at the base 10, the top plate 13 is configured with the first groove 6, and the second box plate 12 is configured with the first snapping groove 9. The two first box plates 11 and the two second box plates 12 are arranged around the periphery of the base 10, the bottom of the first box plate 11 is rotatably connected to the base 10, the bottom of the second box plate 12 is rotatably connected to the base 10, wherein one of the second box plates 12 is snap-fitted with the two first box plates 11, respectively, and the other one of the second box plates 12 is snap-fitted with the two first box plates 11, respectively. The top plate 13 is covered on the first box plates 11 and the second box plates 12, and is in snap connection with the second box plates 12.

Specifically, when the folding box 3 is folded, the top plate 13 and the second box plates 12 are released from the snap connection, to detach the top plate 13 from the first box plates 11 and the second box plates 12; then, the second box plates 12 are disengaged from the first box plates 11, the two first box plates 11 are folded and placed on the base 10 by rotating themselves in opposite directions, and the two second box plates 12 are folded and placed on the first box plates 11 by rotating themselves in opposite directions, thereby folding the folding box 3 effectively and conveniently.

When the folding box 3 needs to be loaded with goods, the two second box plates 12 can be separated from the first box plate 11 by rotating in opposite directions, then, the two first box plates 11 are separated from the base 10 by rotating in opposite directions, in which two ends of one second box plate 12 are respective in snap connection with one end of each of the two first box plates 11, and two ends of the other second box plate 12 are respective in snap connection with the other end of each of the two first box plates 11, so as to form a space for goods enclosed by the first box plates 11 and the second box plates 12. Further, the height of a rotating joint of the first box plate 11 and the base 10 is low than the height of a rotating joint of the second box plate 12 and base 10, such that the first box plates 11 and the second box plates 12 can be laid flat after being folded.

Figure 3:
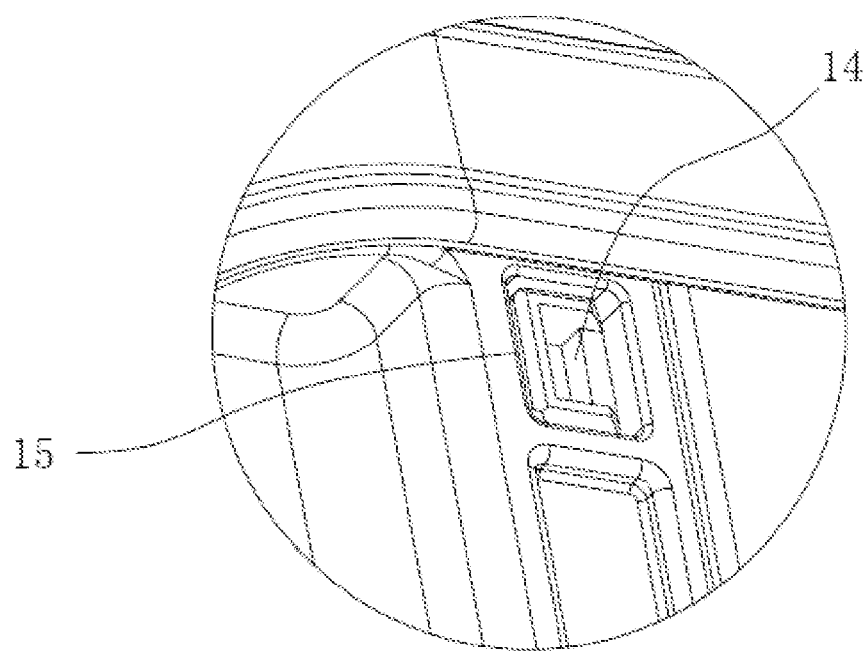
FIG. 3 is an enlarged structural diagram of portion A in FIG. 2.
Figure 4:
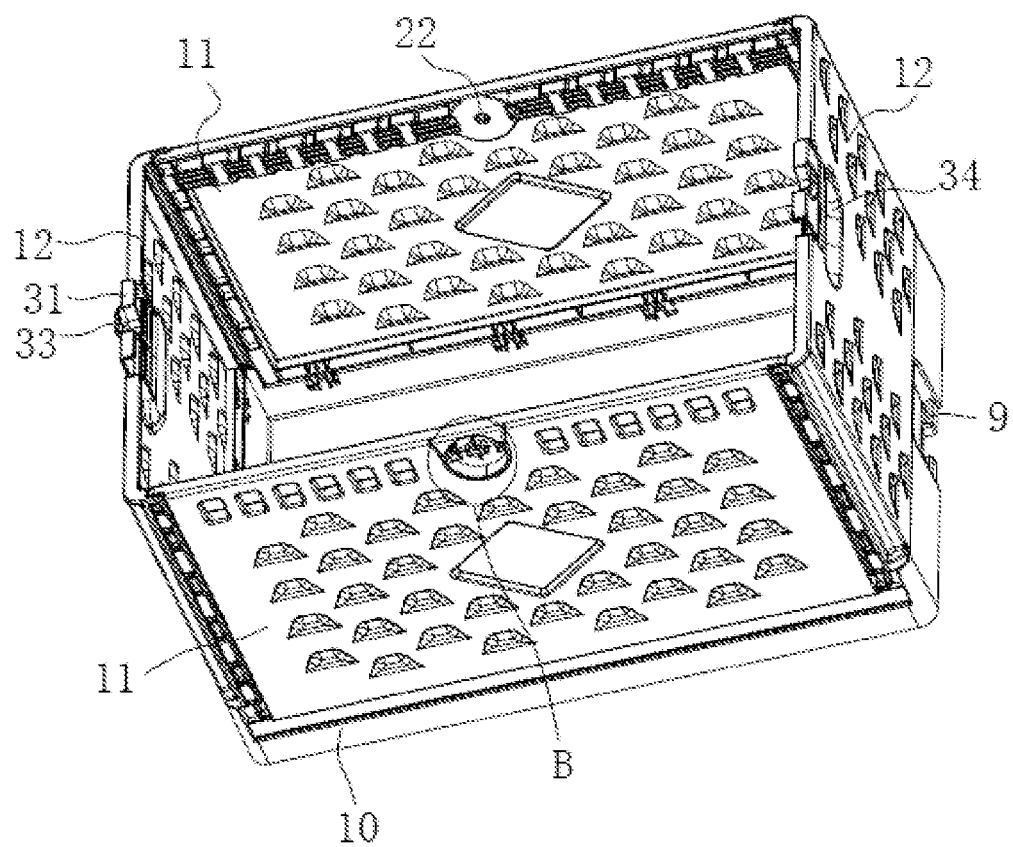
FIG. 4 is a schematic view of a box of a handcart according to an embodiment of the present application without the top plate.
Figure 5:
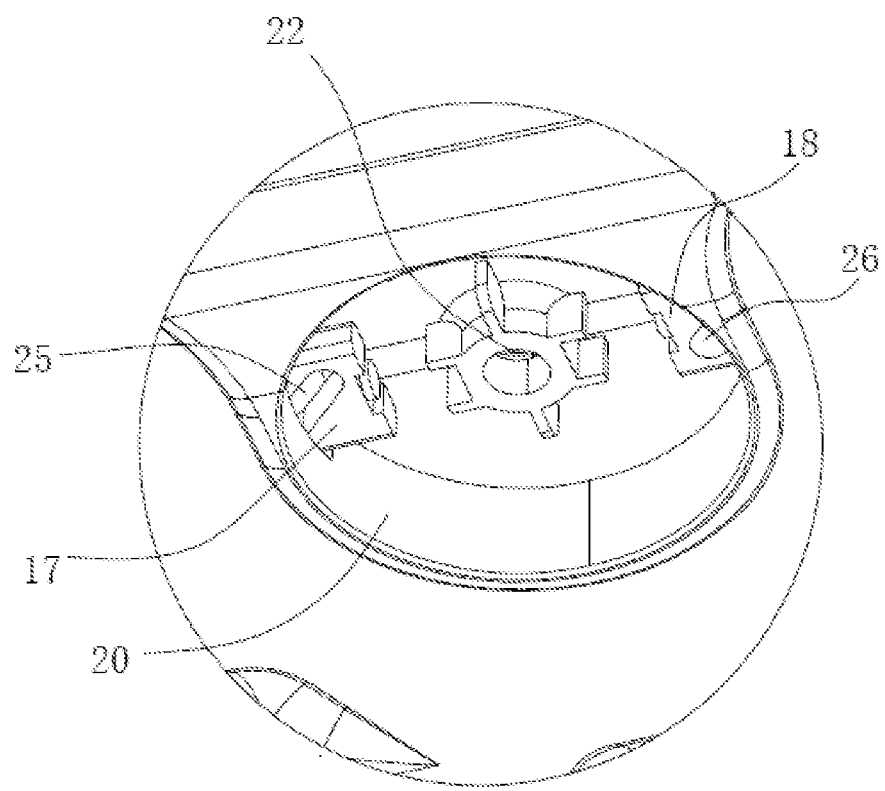
FIG. 5 is an enlarged structural diagram of portion B in FIG. 4.
Figure 6:
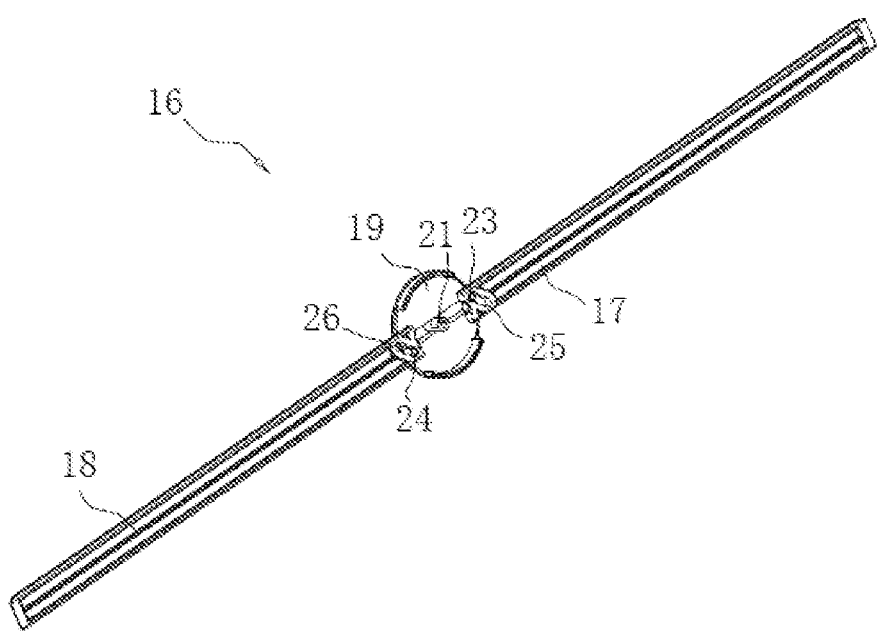
FIG. 6 is a schematic view of a locking assembly of a handcart according to an embodiment of the present application.
Figure 7:
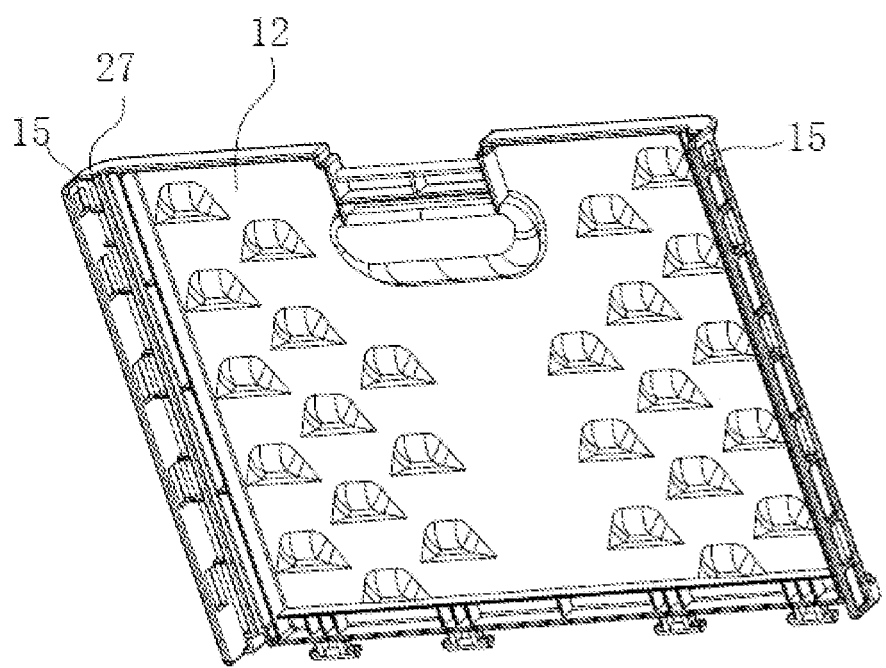
FIG. 7 is a schematic view of the second box plate of a handcart according to an embodiment of the present application.

Referring to the embodiment shown in FIG. 3, two ends of the first box plate 11 each are provided with a snap-fit element 14, and two ends of the second box plate 12 each are configured with a snap-fit hole 15 configured to be snap-fitted with the snap-fit element 14.

The first box plate 11 can be stably connected to the second box plate 12 by the snap-fit engagement between the snap-fit element 14 and the snap-fit hole 15. Specifically, there are several snap-fit elements 14 and snap-fit holes 15.

Referring to the embodiment shown in FIGS. 4-7, the first box plate 11 is further provided with a locking assembly 16, and the locking assembly 16 includes a first locking bar 17, a second locking bar 18, and a knob 19. The first box plate 11 is configured with an accommodation groove 20. The first locking bar 17 and the second locking bar 18 are both inserted in the first box plate 11, wherein one end of the first locking bar 17 protrudes from a groove wall of the accommodation groove 20, the other end of the first locking bar 17 protrudes from one end of the first box plate 11, wherein one end of the second locking bar 18 protrudes from a groove wall of the accommodation groove 20, and the other end of the second locking bar 18 protrudes from one end of the first box plate 11. The knob 19 is provided with a rotating shaft 21, wherein the accommodation groove 20 is configured with a hole 22 for rotationally connected to the rotating shaft 21. The knob 19 is provided with a first sliding component 23 and a second sliding component 24, wherein one end of the first locking bar 17 is configured with a first opening 25, such that the first sliding component 23 is slidable in it, and one end of the second locking bar 18 is configured with a second opening 26, such that the second sliding component 24 is slidable in it. The two second box plates 12 each are configured with a locking slot 27 configured to be inserted in by the first locking bar 17 or the second locking bar 18.

Specifically, when the first box plates 11 and the second box plates 12 have been engaged with each other to form a space for goods, the knob 19 can be rotated for improving the connection stability, such that the first sliding component 23 and the second sliding component 24 are rotated. The rotation of the first sliding component 23 is converted into protruding of the first locking bar 17, so that the other end of the first locking bar 17 protrudes from the first box plate 11 and is inserted into the locking slot 27. At the same time, the rotation of the second sliding component 24 is converted into protruding of the second locking bar 18, so that the other end of the second locking bar 18 protrudes from the first box plate 11 and is inserted into the locking slot 27. Specifically, the knob 19 is rotated counterclockwise for insertion and locking. Besides, when the knob 19 is rotated clockwise, the knob 19 drives the first locking bar 17 to be detached from the corresponding locking slot 27 via the first sliding component 23 and the first opening 25, while the knob 19 drives the second locking bar 18 to be detached from the corresponding locking slot 27 via the second sliding component 24 and the second opening 26. Furthermore, an arc-shaped guiding element protrudes from the knob 19. The arc-shaped guiding element plays a guiding role when the knob 19 is rotated in the accommodation groove 20.

Referring to the embodiment shown in FIG. 8, the handcart body 1 includes a frame body 28, wheel seats 29 and universal wheels 30, wherein the frame body 28 is rotatably connected with the mounting component 4, the wheel seat 29 is mounted at the frame body 28, the universal wheel 30 is mounted at the wheel seat 29, the second groove 7 is formed at the top of the wheel seat 29, and the first snap component 8 is provided at the frame body 28.

The frame body 28 is configured to reduce the weight of the handcart body 1, and the wheel seat 29 is conducive to be screwed to the universal wheel 30 conveniently. The universal wheel 30 is configured to mate with the pull rod 2 to realize a multi-directional movement.

Referring back to the embodiment shown in FIGS. 1-2, the second box plate 12 is rotatably connected with a second snap component 31, and two ends of the top plate 13 are both configured with a second snapping groove 32 configured to be snap-fitted with the second snap component 31, which enables the top plate 13 to connect to the second box plate 12 stably.

Referring back to the embodiment shown in FIG. 1, the second snap component 31 is configured with a relief slot 33, which provides the space for hand to apply force, so as to release the connection between the second snap component 31 and the second snapping groove 32.

Referring back to the embodiment shown in FIGS. 1-2, the second box plate 12 is configured with a handheld slot 34, which provides a space for hand to lift the box or the whole handcart, and is convenient for applying force.

The above are the preferred embodiments of the present application, which are not intended to limit the protection scope of the present application. Therefore, all equivalent changes made according to the structure, shape and principle of the present application should be covered within the protection scope of the present application.

REFERENCE SIGNS LIST 1 handcart body
2 pull rod
3 folding box
4 mounting component
5 insertion component
6 first groove
7 second groove
8 first snap component
9 first snapping groove
10 base
11 first box plate
12 second box plate
13 top plate
14 snap-fit component
15 snap-fit hole
16 locking assembly
17 first locking bar
18 second locking bar
19 knob
20 accommodation groove
21 rotating shaft
22 hole
23 first sliding component
24 second sliding component
25 first opening
26 second opening
27 locking slot
28 frame body
29 wheel seat
30 universal wheel
31 second snap component
32 second snapping groove
33 relief slot
34 handheld slot

What is claimed is:

1. A handcart, comprising a handcart body, a pull rod and a folding box;
the pull rod is provided with a mounting component, the mounting component is rotatably connected to the handcart body; a bottom of the folding box is provided with an insertion component, a top of the folding box is configured with a first groove configured to receive an insertion component of a second folding box disposed on the folding box, the handcart body is configured with a second groove configured to receive the insertion component of the folding box, the handcart body is rotatably connected to a first snap component, and the folding box is configured with a first snapping groove configured to be snap-fitted with the first snap component, wherein:
the folding box comprises two first box plates and two second box plates, each of the two first box plates is provided with a locking assembly, the locking assembly comprises a first locking bar, a second locking bar and a knob, each of the two first box plates is configured with an accommodation groove for accommodating the knob, the first locking bar and the second locking bar are both inserted into a respective one of the two first box plates, a first end of the first locking bar protrudes from a first groove wall of the accommodation groove, a second end of the first locking bar protrudes from a first end of the respective one of the two first box plates, a first end of the second locking bar protrudes from a second groove wall of the accommodation groove, and a second end of the second locking bar protrudes from a second end of the respective one of the two first box plates;
the knob is provided with a rotating shaft, the accommodation groove is configured with a hole configured to be rotationally connected with the rotating shaft, the knob is further provided with a first sliding component and a second sliding component, the first end of the first locking bar is configured with a first opening for sliding of the first sliding component, the first end of the second locking bar is configured with a second opening for sliding of the second sliding component; and
the two second box plates each are configured with a locking slot configured to be inserted in by the first locking bar or the second locking bar.

2. The handcart according to claim 1, wherein the folding box comprises a base and a top plate, the insertion component of the folding box is provided at the base, the first groove is defined at the top plate, and the first snapping groove is defined in one of the two second box plates;
the two first box plates and the two second box plates are arranged around a periphery of the base, a bottom of each of the two first box plates is rotatably connected to the base, and a bottom of each of the two second box plates is rotatably connected to the base;
one of the two second box plates is in snap connection with the two first box plates, respectively, and a second one of the two second box plates is in snap connection with the two first box plates, respectively; and
the top plate is covered on the two first box plates and the two second box plates, and the top plate is in snap connection with the two second box plates.

3. The handcart according to claim 2, wherein two ends of each of the two first box plates each are provided with a snap-fit element, and two ends of each of the two second box plates each are configured with a snap-fit hole configured to be in snap-fit engagement with the snap-fit element.

4. The handcart according to claim 1, wherein the handcart body comprises a frame body, wheel seats and universal wheels, the mounting component is rotatably connected to the frame body, the wheel seats are mounted at the frame body, the universal wheels are mounted at the wheel seats, the second groove is defined at a top of each of the wheel seats, and the first snap component is provided at the handcart body.

5. The handcart according to claim 2, wherein each of the two second box plates are rotatably connected to a second snap component, and two ends of the top plate each are configured with a second snapping groove configured to be in snap connection with the second snap component.

6. The handcart according to claim 5, wherein the second snap component is configured with a relief slot.

7. The handcart according to claim 2, wherein each of the two second box plates is configured with a handheld slot.

* * * * *